United States Patent
Sesita et al.

(10) Patent No.: US 7,573,171 B2
(45) Date of Patent: Aug. 11, 2009

(54) ROTATION CONTROL MOTOR

(75) Inventors: Naoto Sesita, Kawasaki (JP); Katuyuki Tanaka, Kawasaki (JP); Yusuke Mizukoshi, Kawasaki (JP); Hiroyuki Kurihara, Fujisawa (JP); Yoshihisa Watanabe, Kawasaki (JP)

(73) Assignee: Igarashi Electric Works Ltd. (JP)

( * ) Notice: Subject to any disclaimer, the term of this patent is extended or adjusted under 35 U.S.C. 154(b) by 536 days.

(21) Appl. No.: 11/379,667

(22) Filed: Apr. 21, 2006

(65) Prior Publication Data

US 2006/0236802 A1  Oct. 26, 2006

(30) Foreign Application Priority Data

Apr. 26, 2005  (JP)  ............... 2005-128418

(51) Int. Cl.
*H02K 21/00*  (2006.01)

(52) U.S. Cl. ............... 310/180; 310/198; 310/234; 74/425; 49/339; 49/340; 49/341

(58) Field of Classification Search ............... 49/138, 49/339, 340, 341, 342, 344; 74/425; 310/180, 310/198, 234
See application file for complete search history.

(56) References Cited

U.S. PATENT DOCUMENTS

| | | | | | |
|---|---|---|---|---|---|
| 3,573,518 | A | * | 4/1971 | Liles | ............... 310/103 |
| 4,156,478 | A | * | 5/1979 | Kroeger | ............... 188/171 |
| 4,228,396 | A | * | 10/1980 | Palombo et al. | ............... 324/163 |
| 4,300,082 | A | * | 11/1981 | Angersbach et al. | ........ 318/614 |
| 4,643,282 | A | * | 2/1987 | Edl | ............... 192/18 B |
| 4,703,841 | A | * | 11/1987 | Lengsfeld et al. | ....... 192/12 BA |
| 5,503,349 | A | * | 4/1996 | Chertok | ............... 242/422.2 |
| 6,272,970 | B1 | * | 8/2001 | Schaefer | ............... 92/72 |
| 6,492,807 | B2 | * | 12/2002 | Spellman | ............... 324/207.22 |
| 6,964,449 | B2 | * | 11/2005 | Takeda et al. | ............... 296/146.4 |
| 7,211,918 | B2 | * | 5/2007 | Migita et al. | ............... 310/215 |
| 7,230,402 | B2 | * | 6/2007 | Kumagai et al. | ....... 318/568.11 |
| 7,429,073 | B2 | * | 9/2008 | Watanabe et al. | ........ 296/146.4 |
| 2006/0192453 | A1 | * | 8/2006 | Gieras et al. | ............... 310/92 |
| 2006/0236802 | A1 | * | 10/2006 | Sesita et al. | ............... 74/425 |
| 2006/0238060 | A1 | * | 10/2006 | Sesita et al. | ............... 310/180 |
| 2006/0290230 | A1 | * | 12/2006 | Tsukamoto | ............... 310/216 |
| 2007/0158151 | A1 | * | 7/2007 | Deconti | ............... 188/264 D |
| 2007/0170795 | A1 | * | 7/2007 | Yokomori et al. | ............... 310/77 |
| 2007/0188039 | A1 | * | 8/2007 | Migita et al. | ............... 310/218 |

FOREIGN PATENT DOCUMENTS

| | | |
|---|---|---|
| JP | 10-141409 | 5/1998 |
| JP | 11-72395 | 3/1999 |
| JP | 2004-175211 | 6/2004 |

\* cited by examiner

*Primary Examiner*—Jerry Redman
(74) *Attorney, Agent, or Firm*—McKee, Voorhees & Sease, P.L.C.

(57) ABSTRACT

A rotation control motor comprises a shaft, an armature having an armature core of which teeth are wound by wires to form coils, a commutator, and a field magnet. The armature core has a plurality of teeth, the commutator has a plurality of commutator segments corresponding to the number of teeth, and the coils comprise a normal coil and a brake coil. When the motor rotates faster than expected, the brake coil brakes the motor by magnetic flux, and the motor can rotate within a stable speed range.

6 Claims, 4 Drawing Sheets

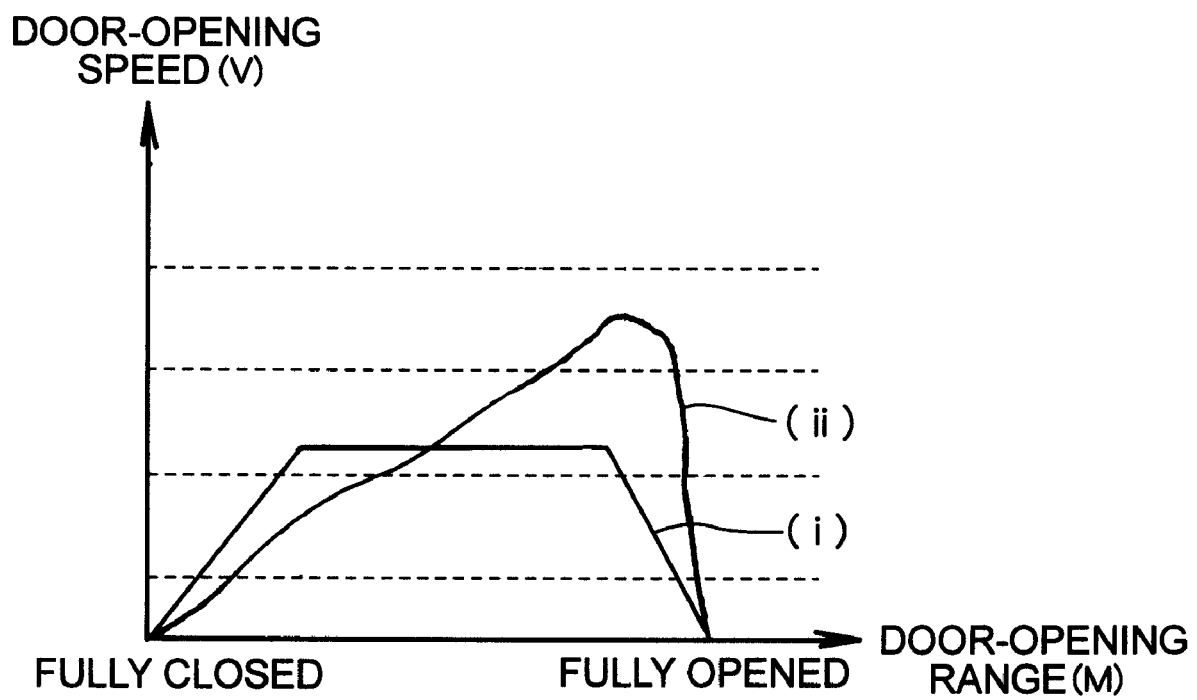

ROTATION CONTROL MOTOR

BACKGROUND OF THE INVENTION

The present invention relates to a rotation control motor, and more precisely, a rotation control motor used as a motor for opening and closing a gull-wing type back door to be opened and closed provided on a vehicle such as an automobile or a sliding door provided on the side or the roof thereof.

A door opening-closing device for opening and closing a sliding door provided on the side of an automobile by a motor is disclosed in JP11-72395A.

For example, as shown in JP10-141409A, a hatch back type automobile or a van is equipped with a gull-wing type back door for taking out and putting in baggage from the rear. A gas spring is provided as opening and closing auxiliary means for assisting opening and closing force of the back door. Generally, the gas spring is filled up with high-pressure gas for supporting the weight of the back door and hydraulic oil for applying damping force near the partition end.

A back door opening-closing device for assisting opening and closing force by a gas spring and a motor is known by JP2004-175211A (see FIG. 9).

However, the back door opening-closing device for assisting opening and closing force by the gas spring contributes little to rotation moment of a gas spring force for rotating the door in a vertical direction because the door and the gas spring are attached approximately in parallel when the back door is closed. Therefore, the door is heavy and is hard to open at the beginning, and jumps up when the door opens at a position in which pressing force overcomes its weight. On the other hand, when the gas spring and the motor are used together, the door can be opened and closed relatively smoothly with the aid of the motor even if the door and the gas spring are attached at the above angle.

However, auxiliary support force by the gas spring or the motor is not usually in proportion to rotation angle of the door. So, when opening torque becomes less on a slope or when the temperature changes greatly, a relationship between rotational position of the door and torque required for rotation differs from expected, which makes the motor high-speed rotation when a motor load is light. After all, the door jumps up forcefully and is likely to collide against an obstacle.

As for the door opening-closing device for opening and closing the sliding door on the side or the roof of the automobile by the motor in a horizontal direction, opening torque of the door differs when the automobile is on the slope. When the door opens downwards, motor load becomes less, the motor rotates at high speed, and the door may open forcefully.

SUMMARY OF THE INVENTION

In view of the disadvantages in the prior art, it is an object of the invention to provide a rotation control motor, the motor rotating within a stable speed range by braking the rotation when the rotation of the motor is faster than the expected.

BRIEF DESCRIPTION OF THE DRAWINGS

FIG. 6 is a graph of the door-opening speed with respect to the door-opening range with the actuator having the motor according to the present invention and with a known gas spring actuator, and with the known gas spring actuator only.

DETAILED DESCRIPTION OF PREFERRED EMBODIMENTS

Hereinafter, a preferred embodiment of the present invention is described with reference to figures.

Figure 1:
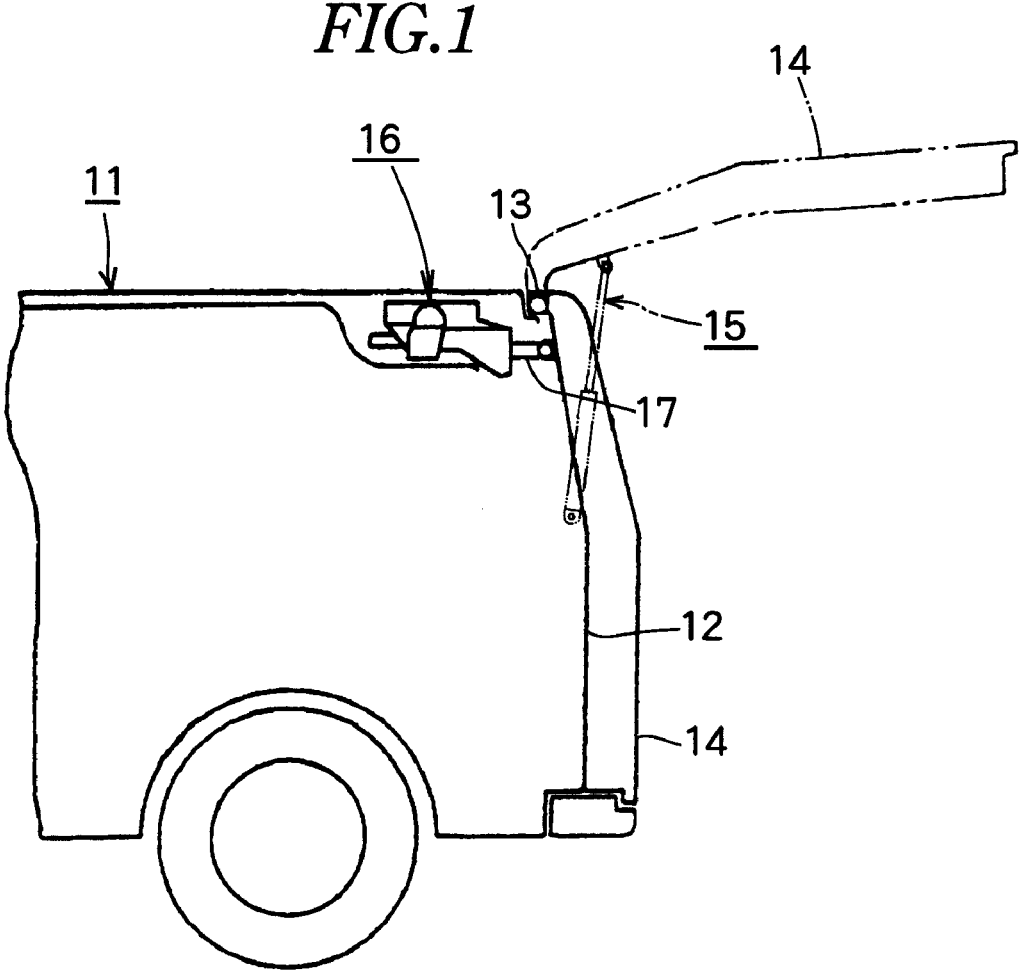
FIG. 1 is a side view of an automobile provided with a rotation control motor according to the present invention.

FIG. 1 is a side view of an automobile of van type or equivalent type having a back door with a motor according to the present invention.

In FIG. 1, a back door 14 is provided on a rear frame 12 of an automobile 12. The back door 14 can rotate between a closing position in a solid line and a full opening position in two-dotted lines by rotating downward and upward around a pivot 13 as a supporting point. A pair of gas spring actuators 15, 15 for left and right side respectively is provided inside the back door 14 between the rear frame 12 and the back door 14, and a motor drive actuator 16 with a rotation control motor according to the present invention is provided at the upper part of the back door 14.

The gas spring actuators 15, 15 are well-known, energize the back door 14 toward the opening direction when the back door 14 is in an opening position above a predetermined position and have some resistance when the back door 14 is in a closing position below the predetermined position, and the back door 14 can be closed smoothly.

Figure 2:
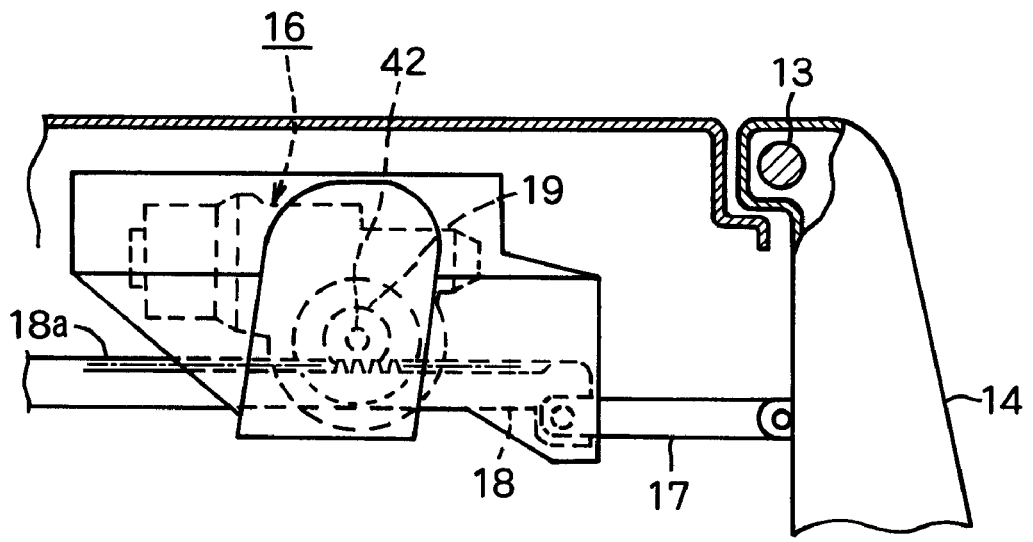
FIG. 2 is an enlarged view of the main part in the automobile in FIG. 1.

As shown in FIG. 2, the motor drive actuator 16 is provided on a rack 18a of an output member 18 which moves back and forth of the automobile 11 by meshing with a pinion 19. The rack 18a is connected to a link lever 17 rotating with the back door 14 back and forth.

Figure 3:
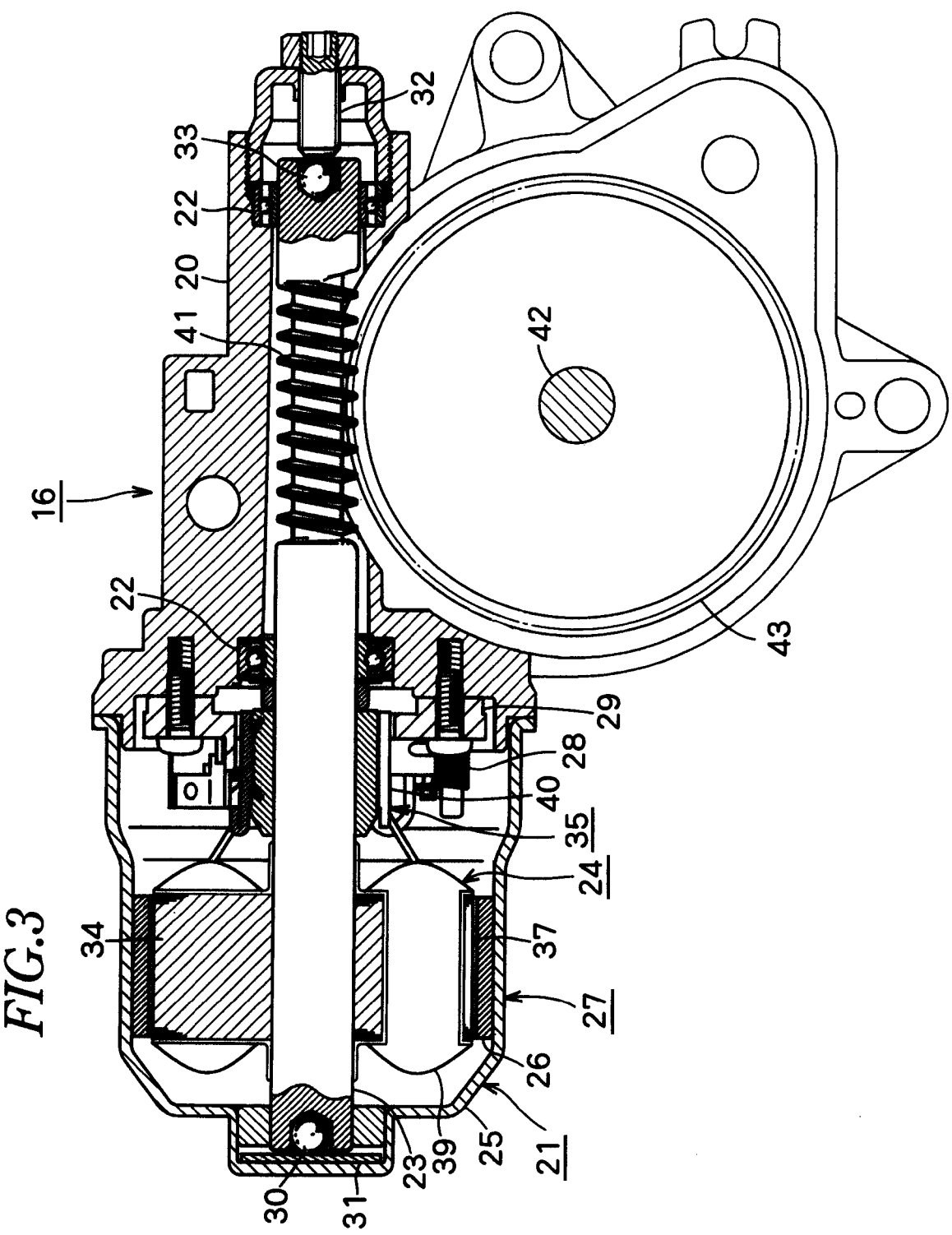
FIG. 3 is a sectional view showing the internal structure of a motor drive actuator of the automobile in FIG. 1.

FIG. 3 is a sectional view showing the inside of the motor drive actuator 16. As shown in FIG. 3, the motor drive actuator 16 has a rotation control motor 21 at the end of an actuator case body 20.

The motor 21 comprises a shaft 23, an armature 24 and a stator 27. The shaft 23 penetrates in the center of the actuator case body 20 and is supported rotatably on a right side bearing 22 and a left side bearing 22. The armature 24 is fixed on the shaft 23. The stator 27 is formed by a yoke 25 which envelopes the armature 24, is fixed to the end of the actuator case body 20, and serves as a closed-end cylindrical motor case, and by a permanent magnet 26 as a field magnet fixed on the inner circumferential surface of the yoke 25.

Brushes 28 supplying current to the armature 24 from the outside are attached to the actuator case body 20 through boards having electrical terminals (not shown), respectively. A bearing 31 for receiving axial force through a steel ball 30 inserted at the left end of the shaft 23 in the yoke 25 is provided. Also, a bearing 32 for receiving axial force through a steel ball 33 inserted at the right end of the shaft 23 is provided.

The permanent magnet 26 is formed annularly, pressingly fitted, and fixed adhesively on the yoke 25 as needed. N poles and S poles are alternately provided at regular intervals on the inner circumferential surface of the permanent magnet 26.

An armature core 34 is fixed to the shaft 23 inside the permanent magnet 26. A commutator 35 is provided at the right side of the armature core 34 in FIG. 3, the brushes 28 is provided around the commutator 35 at regular intervals.

Figure 4:
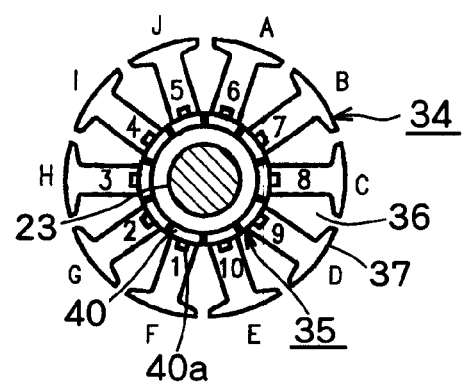
FIG. 4 is an enlarged view of an armature core and a commutator in the motor.
Figure 5:
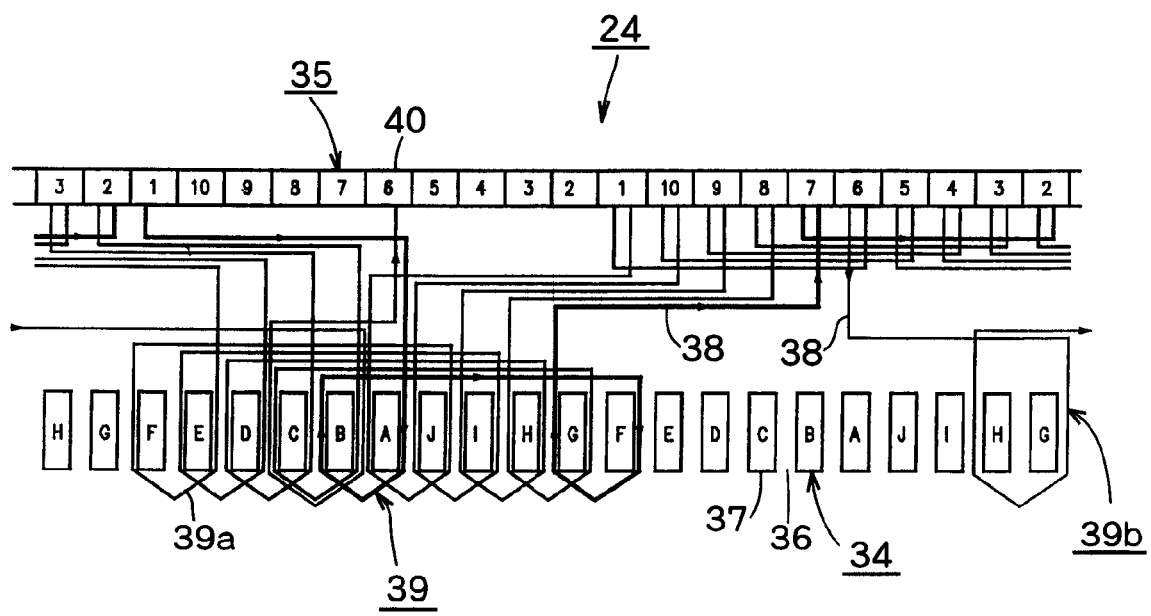
FIG. 5 is a developed view showing the connection of the motor in the actuator.

FIG. 4 is an enlarged view of the armature core 34 and the commutator 35. In FIG. 4, the armature core 34 is formed by layers of Si steel plates, in which equally spaced ten slots 36 extending along the shaft 23 are formed and approximately T-shaped ten teeth 37(A)-37(J) in FIGS. 4 and 5 are formed apart equally from one another by each of the slots 36. Teeth 37(A)-37(J) are wound by wires 38 based on a predetermined manner to form coils 39.

The commutator 35 has ten commutator segments 40(1)-40(10) which are fixed on the shaft 23 shown in FIGS. 4 and 5. The commutator segments 40(1)-40(10) are insulated from one another and arranged circumferentially, the outer circumferential face thereof being in sliding contact with the brushes 28. The commutator segments 40(1)-40(10) have engagement parts 40a for connecting to each end of the wires 38, respectively.

FIG. 5 is a developed view showing the connection of the rotation control motor 21 in the motor drive actuator 16 shown in FIG. 3. The coils 39 comprises a normal coil 39a and a brake coil 39b which are formed by the wires 38 with the same diameter and material wound on the predetermined teeth 37 of the armature core 34.

As shown in FIG. 5, the normal coil 39a is formed as follows. The wire 38 from the commutator segment 40(1) is wound on the tooth 37(A) and the tooth 37(B) with the predetermined number of turns, wound on the tooth 37(F) and the tooth 37(G) with the predetermined number of turns, and returned to the commutator segment 40(7). The wire 38 from the commutator segment 40(2) is wound on the tooth 37(B) and the tooth 37(C) with the predetermined number of turns, wound on the tooth 37(G) and the tooth 37(H) with the predetermined number of turns, and returned to the commutator segment 40(8). The wire 38 from the commutator segment 40(3) is wound on the tooth (C) and the tooth 37(D) with the predetermined number of turns, wound on the tooth 37(H) and the tooth 37(I) with the predetermined number of turns, and returned to the commutator segment 40(9). Predetermined normal coils 39a are formed by similar winding, the tooth to be wound being offset to an adjacent tooth sequentially.

On the other hand, the brake coil 39b is formed by the wire 38 wound on predetermined teeth 37 overlappingly with the normal coil 39a. The wire 38 from the commutator segment 40(6) is wound on the tooth 37(G) and the tooth 37(H) with the predetermined number of turns, wound on the tooth 37(B) and the tooth 37(C) which are offset in equal circumferentially, that is, 180 degrees with the predetermined number of turns, and returned to the same commutator segment 40(6), thereby forming a short circuit. Therefore, as for the brake coil 39b, the greater the number of rotations of the armature 24 increases, the greater the electromotive force which is proportional to its number of rotations is generated between terminals of the brake coils 39. Also, the brake coil 39b bears magnetic flux by short current of the electromotive force, the magnetic flux functions as a load against rotation of the armature 24, thereby restraining high speed rotation of the motor 21.

A diameter of the wire 38 is 0.6 mm, the number of windings of the normal coils 39a and brake coil 39b are 17 and 5 respectively, but the diameter of the wire 38, the number of windings and a winding type of each coil 39a, 39b depend on a performance requirement. In other words, a magnitude of the load by the brake coil 39b can be changed by modifying the number of the teeth 37 and the number of windings of the wire 38. Generally, the more the number of the teeth 37 is, the heavier the load becomes. As for the winding type of the brake coils 39b, the teeth 37 spaced equally (for example, 180°, 120°, 90°, etc.) are wound by the wire 38 so as to balance them with the load against the rotation of the armature 24, thereby restraining vibration and noise by unevenness of rotation.

A worm gear 41 is formed on the shaft 23 between the bearings 22, 22. A worm wheel 43 which is attached to a drive shaft 42 rotating with the pinion 19 shown in FIG. 2 meshes with the worm gear 41 as a reduction gear.

Operations are described hereinafter. In the present invention, the motor 21 is powered by a switch interlocked with a lock release lever (not shown) of the back door 14. Therefore, as the lock release lever is operated, the motor 21 rotates positively, of which rotations is transmitted through the shaft 23, the worm gear 41, the drive shaft 42, the pinion 19 and the rack 18a to the output member 18, thereby moving the output member 18 toward an opening direction. Then, the link lever 17 rotates with the pivot 13 and the back door 14 toward the opening direction, and the back door 14 begins to rotate. As the back door 14 opens to some extent, a force of the actuator 15 is added, and the back door 14 is opened by a great amount of force. After the back door 14 is fully opened, the motor 21 is not powered by the switch (not shown) and the rotation of the motor 21 comes to an end.

The power to the normal coils 39a is controlled by an electrically programmable means, in which the number of rotations of the motor 21 is fed back. The control means are well-known.

Then, when the automobile 11 stops on a slope and opening torque is much less than the expected, load torque applied to the actuator 15 and the motor 21 in the actuator 16 decreases, the motor 21 is rotated by external force for opening the back door 14 rapidly, and the motor 21 rotates faster than the expected. The faster the motor 21 rotates and the more the number of rotations is, the greater the electromotive force is generated between terminals of the brake coil 39b. Great amount of magnetic flux is formed on the brake coil 39b by the electromotive force and works as a load against the rotation of the armature 24, thereby restraining the rotation of the motor 21. Therefore, the back door 14 can not jump up forcefully.

FIG. 6 is a graph showing a relationship of the door-opening speed between the actuator 16 having the motor 21 with the known actuator 15 and the known actuator 15 only, in which (i) shows the door-opening speed using actuators 15 and 16 and (ii) shows the door-opening speed using actuator 15 only. A vertical axis indicates door-opening speed (V) and a horizontal axis indicates door-opening range (M).

As in the case (i) of the preferred embodiment, as the motor 21 activates simultaneously when the back door 14 begins to open, the door 14 begins to open smoothly, and the opening speed is brought under control within a control range by speed control of the motor 21. This prevents the back door 14 from jumping up forcefully and colliding with obstacles strongly. On the other hand, as in the case that the known actuator 15 only is used (ii), when the load of the back door 14 is light, the back door 14 jumps up rapidly with the increase of speed at the opening end and is likely to collide obstacles.

The present invention is described with the back door 14, but is applicable to a door opening-closing device for opening and closing a sliding door horizontally provided on the side of an automobile and a door opening-closing device for opening and closing a sun roof by a motor. By using the actuator 16 for such cases, the same advantage as in the above embodiment can be obtained. The present invention is described using the actuator 16 with the actuator 15, but only the actuator 16 can be used.

Therefore, according to the present invention, when the motor 21 rotates faster than the expected, the brake is applied to the motor 21 automatically and the motor 21 can rotate within the stable speed range at all times, so the rotation control can be achieved with a simple structure without a particular speed control circuit. Also, as the magnitude of magnetic flux for the brake can be altered by adjusting the number of windings on the brake coils or the number of teeth to be wound, the device can respond easily when the required performance is changed. Furthermore, as the same diameter is used for the wire 38 wound on the normal coils 39*a* and for the wire 38 wound on the brake coil 39*b*, the brake coil 39*b* can be wound concurrently with the winding of the normal coils 39*a* in the same process.

The foregoing merely relate to embodiments of the invention. Various changes and modifications may be made by a person skilled in the art without departing from the scope of claims wherein:

What is claimed is:

1. A rotation control motor comprising:
   a yoke;
   a shaft provided in the yoke;
   an armature having an armature core fixed on the shaft and having a plurality of teeth separated by a plurality of core slots extending along the shaft, the plurality of teeth being wound by wires that form coils;
   a field magnet fixed on an inner circumferential surface of the yoke; and
   a commutator fixed on the shaft close to the armature, the commentator having a plurality of commutator segments on an outer circumferential surface; and
   wherein a first wire extends from a first of the commutator segments and is wound on a first of said plurality of teeth and returns to a second of the commutator segments to form a normal coil, while a second wire extends from a third of the commutator segments and is wound on a second of said plurality of teeth of the armature and returns to the third of the commutator segments to form a brake coil acting as a short circuit.

2. The rotation control motor of claim 1 wherein the first wire is wound around a third of said plurality of teeth that is adjacent to the first of said plurality of teeth and wherein the second wire is wound around a fourth of said plurality of teeth that is adjacent to the second of said plurality of teeth.

3. The rotation control motor of claim 2 wherein the first and third of said plurality of teeth are opposite to the second and fourth of said plurality of teeth.

4. The motor of claim 1 wherein the normal coil and the brake coil have the same diameter.

5. The motor of claim 1 wherein the plurality of teeth has ten teeth and the plurality of commutator segments has ten commutator segments, wherein the second wire from the third commutator segment is wound in a first loop around a first pair of adjacent teeth, then around a second pair of adjacent teeth in a second loop, the second pair of adjacent teeth being opposite to the first pair of adjacent teeth, the wire is then is returned to the third commutator segment.

6. The motor of claim 1 wherein the short circuit generates electromotive force proportional to the number of rotations of the armature at the commutator segment.

* * * * *

UNITED STATES PATENT AND TRADEMARK OFFICE
CERTIFICATE OF CORRECTION

| | | |
|---|---|---|
| PATENT NO. | : 7,573,171 B2 | Page 1 of 1 |
| APPLICATION NO. | : 11/379667 | |
| DATED | : August 11, 2009 | |
| INVENTOR(S) | : Sesita et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Seventh Day of September, 2010

David J. Kappos
*Director of the United States Patent and Trademark Office*